Patented Apr. 16, 1935

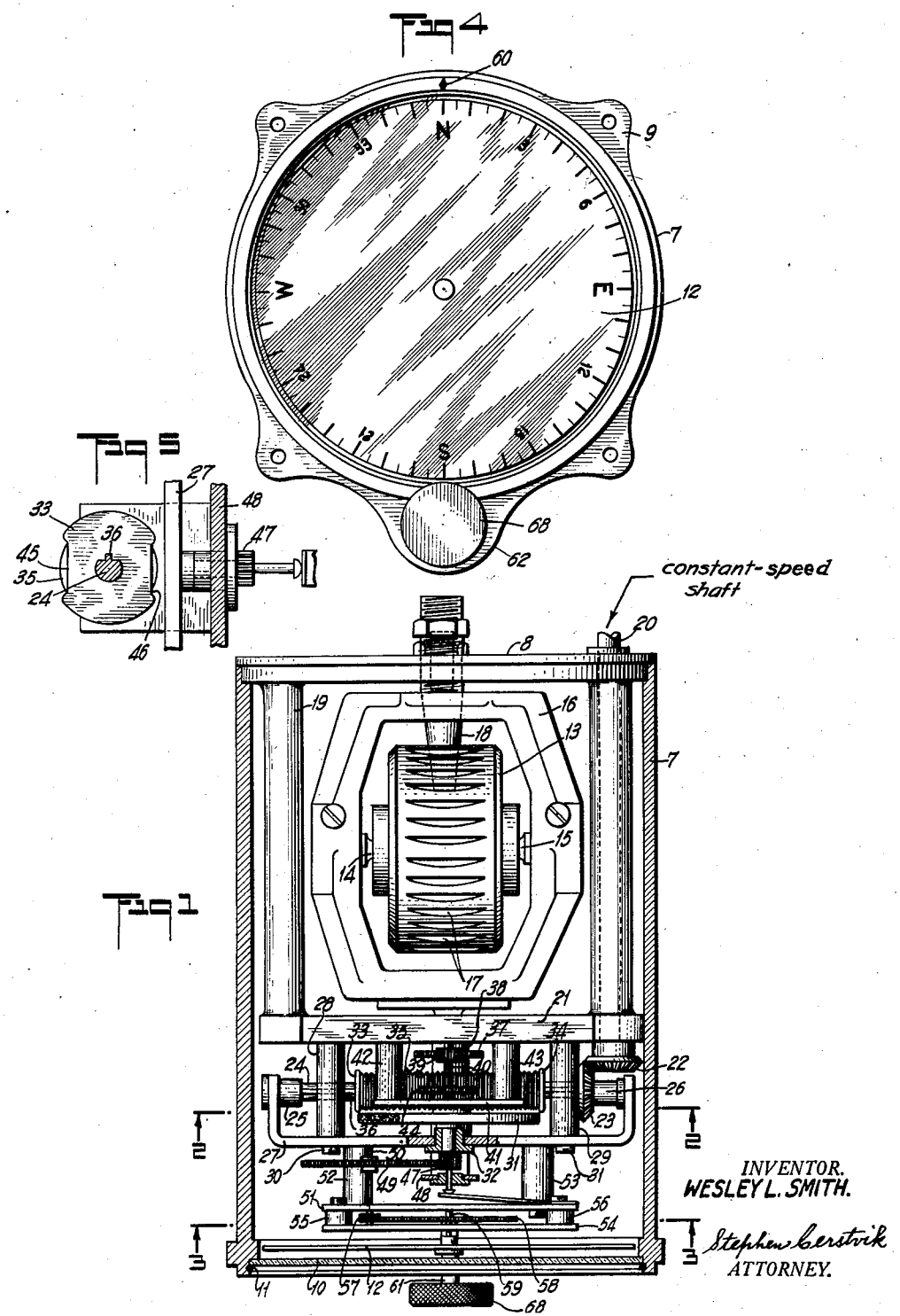

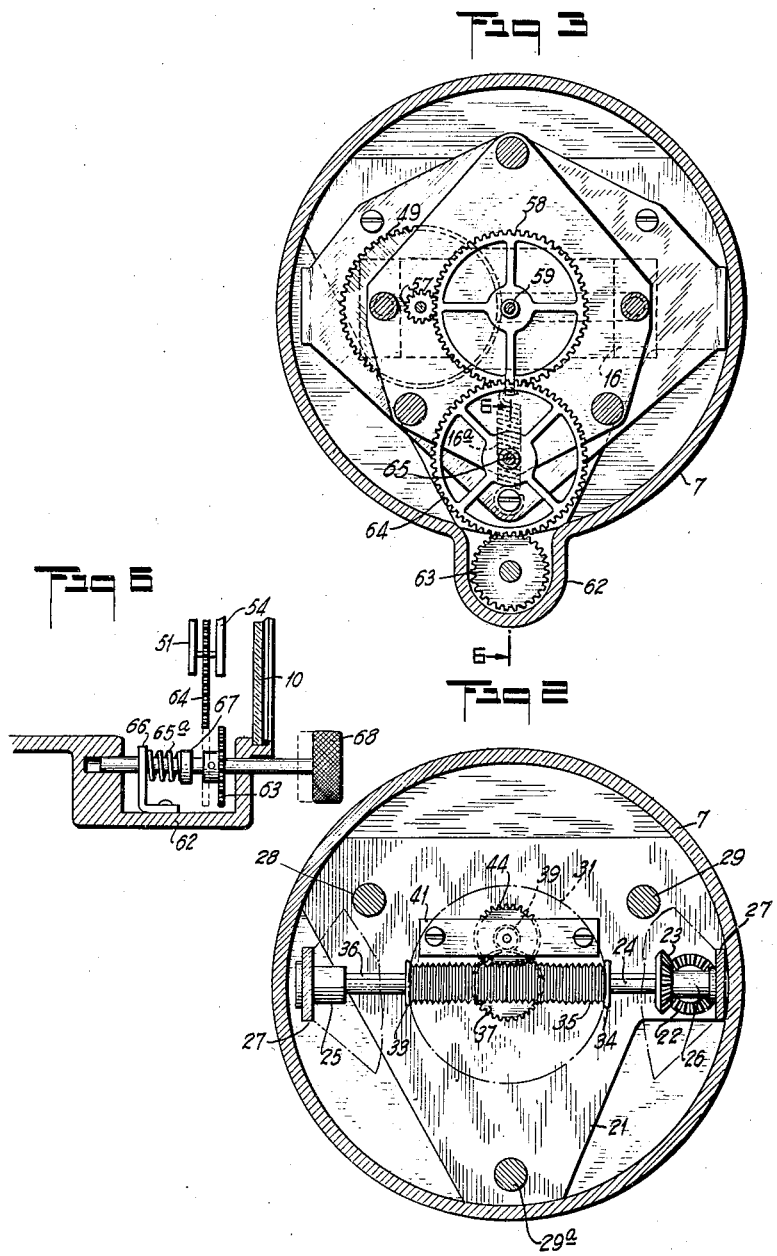

1,998,207

UNITED STATES PATENT OFFICE 1,998,207

TURN INDICATOR

Wesley L. Smith, Cranford, N. J., assignor, by mesne assignments, to Eclipse Aviation Corporation, East Orange, N. J., a corporation of New Jersey Application May 6, 1932, Serial No. 609,714

7 Claims. (Cl. 33—204)

The present invention relates to indicating instruments, and more particularly to means for indicating the angular distance traversed by a mobile object during a turn or a departure from a set path or course at any rate of such turn or departure.

Heretofore, magnetic compasses have been empoyled for indicating the angular departure of a mobile object from a predetermined or selected path or course, which indicated, in degrees, the amount of such deviation or departure but which, however, have the disadvantage that a certain amount of unavoidable lag exists between the deviation and the indication of such deviation since, when a deviation is first initiated, the magnetic elements of the compass tend to move with the mobile object due to the inertia of said elements and a certain time elapses before the elements reestablish their position with respect to the magnetic poles of the earth, the time interval depending upon the amount of said inertia of the magnetic elements and the compass card associated therewith. It is apparent that the mobile object might depart several degrees from its set path or course before the amount of such departure could be ascertained, and even then not very accurately due to oscillations of the compass card on its pivotal support.

Accordingly, one of the objects of the present invention is to provide a novel instrument in which the foregoing difficulties are eliminated, and which is so constructed and arranged that there is no lag between the deviation and the indications of such deviation, i. e. the indications are produced in synchronism with and at the rate of departure of the mobile object from any set path or course.

Another object is to provide novel means whereby the angular distance traversed by a mobile object, such as a ship or aircraft, during a turn at any rate of such turn, may be indicated.

A further object of the invention is to provide novel means for indicating a predetermined or selected path or course to be followed by a mobile object and for indicating when the mobile object deviates from the course, and the amount of such deviation as soon as the mobile object deviates from said course, thereby eliminating any lag between the deviation and indication such as is usually present in a magnetic compass.

A still further object is to provide in combination with a rate of turn indicator, novel means for combining the element of time with the rate of turn in proportion to such rate whereby the angle or amount of turn or deviation may be determined and indicated.

Still another object is to provide a novel method of indicating the angular departure of a mobile object from any set path or course whereby lag between the departure and the indication of such departure is eliminated and the indications produced in synchronism with and at the rate of such departure.

The above, and other objects and advantages of the invention will appear more fully hereinafter from a consideration of the detailed description which follows, taken together with the accompanying drawings wherein is illustrated one embodiment of the invention. It is to be expressly understood, however, that the drawings are for the purpose of illustration and description only, and are not designed as a definition of the limits of the invention, reference being had, primarily, to the appended claims for this purpose.

In the drawings wherein like reference characters refer to like parts throughout the several views, Fig. 1 is a longitudinal section through the casing of one form of instrument embodying the present invention and illustrating the various elements constituting the novel instrument as viewed from the top thereof;

Fig. 2 is a cross-sectional view taken on line 2—2 of Fig. 1;

Fig. 3 is another cross-sectional view taken on line 3—3 of Fig. 1;

Fig. 4 is a front elevation of the instrument shown in Fig. 1;

Fig. 5 is an enlarged detail view of a portion of the integrating mechanism employed in the present embodiment of the invention; and Fig. 6 is a partial sectional view taken on line 6—6 of Fig. 3 showing the adjusting means for setting the instrument to be operated on a selected path or course.

The invention is particularly suitable for use on aircraft to indicate the angular distance traversed by said craft during a turn thereof at any rate of such turn, although the instrument is not limited to such use and may be employed just as advantageously and efficiently on other types of vehicles, such as marine vessels, and the like.

As pointed out hereinbefore, there is provided by the present invention a novel device for indicating the angular deviation of or the angular distance traversed by a mobile object during a turn or a departure from a set path or course at any rate of such turn or departure. The device, in general, comprises means for obtaining or deriving, in any suitable manner, the rate of turn or deviation of the mobile object, means for combining the element of time with the rate, i. e., integrating mechanically the rate of turn with respect to time, and indicating the results of such integration.

In accordance with the invention, the various objects and advantages set forth above may be obtained by providing a rate of turn responsive device such, for example, as a gyroscopic turn indicator well-known to those skilled in the art to which this invention appertains, and adapted to be mounted on a mobile object the deviation of which is to be indicated, and integrating with respect to time the rate at which the mobile object deviates from any set path or course whereby the amount of the deviation or departure, or the angular distance traversed during such departure, may be ascertained. The integration of the rate with respect to time is accomplished mechanically by the provision of a constant-speed mechanism for combining the element of time with the rate of turn or departure whereby the amount or the angle of such departure is obtained. Course-indicating means are also provided which are adjustable to operate with reference to any set path or course.

Referring now to the drawings, and more particularly to Fig. 1, the novel instrument embodying the present invention is constituted by a casing or housing 7 of some suitable light weight material such, for example, as a phenolic-condensation product or aluminum, said casing having a rear wall 8 secured to or, as in the present embodiment, formed integral with said casing. The latter is also provided with projecting lugs or ears 9 (Fig. 4) for mounting the instrument on an instrument panel of a mobile object, such as a ship or aircraft. The front of the casing is closed by means of a suitable transparent member, such as a cover-glass 10, which may be held in position in any suitable well-known manner such, for example, as by means of a clamping ring 11 and through which suitable course-indicating means, such as a dial 12, may be viewed to indicate the results to be obtained by the instrument in a manner to be described hereinafter.

Means are provided which are responsive to the rate of turn or departure of the mobile object with which the instrument is adapted to be associated, and in the present embodiment are constituted by a rate of turn indicator of the type now generally employed on aircraft and, in the form shown, comprises a gyroscope having a rotor 13 journaled at 14 and 15 in a frame 16 so that the rotor will rotate about an axis parallel to or coinciding with the transverse axis of the craft on which the instrument is mounted. The rotor may be driven in any suitable manner, but as illustrated is arranged to be air-operated, and for this purpose the rotor is provided on its periphery with a plurality of turbine buckets 17 against which a jet of air is directed by means of a nozzle 18, the air being supplied thereto from a suitable source (not shown), or the air supply may be provided by exhausting the casing at any suitable point therein and leaving the exterior end of the nozzle 18 open to the atmosphere so that air will be sucked therethrough into the casing as the latter is exhausted, thereby directing the air which is sucked in from the exterior of the casing against the buckets 17, in the manner shown in Patents No. 1,407,491 and 1,433,102 issued to Elmer A. Sperry and Lawrence B. Sperry, respectively, on February 21, 1922, and October 24, 1922, respectively.

The frame 16 which carries the gyro rotor is journaled in a suitable frame 19 so that upon turning of the mobile object, and hence the casing 7, about a vertical axis, which herein would be perpendicular to the plane of the paper, the frame will precess about another perpendicular axis which is parallel to or coincides with the longitudinal axis of the mobile object, as for example the axis Y—Y. As is well known to those skilled in the art, a gyroscope of the type described above and having two degrees of freedom is responsive to the rate of turn about an axis which is perpendicular to the axis of rotation of the rotor and to the axis of precession. Suitable centralizing means such, for example, as a coil spring 16a, shown in dotted lines in Fig. 3, are provided for centralizing the gyro frame 16 after precession has ceased, i. e., for returning the frame to normal position. Obviously, air-operated means of the type shown in a co-pending application of Adolf Urfer, Serial No. 544,026, filed June 12, 1931, may also be used. In this manner the rate of turn of a craft on which the casing 7 is mounted is obtained.

It is desirable however that the amount of such turn may be obtained, and this may be accomplished by integrating the rate of such turn with respect to time, and accordingly novel means are provided for combining the element of time with the rate of turn to obtain the angular distance traversed during such turn. In the present instance said means comprise an integrating mechanism which, in the form shown, is constituted by a constant-speed mechanism including a shaft 20 (Fig. 1) which extends through the rear wall 8 of the casing 7 and which is journaled therein and in a plate 21 forming a part of the frame 19. The shaft 20 may be connected to any suitable drive (not shown) having a constant speed, and on one end of said shaft there is provided a bevel gear 22 which is arranged to mesh with another bevel gear 23 secured to or formed integral with a shaft 24 journaled in bearings 25 and 26 carried by a bracket 27, the latter being secured to the plate 21 in spaced relation therewith in any suitable manner as by means of spacing rods 28 and 29 and screws 30 and 31.

Means are now provided for combining with the rate of turn the element of time which is derived from the drive shaft 20 and, as illustrated, comprise a friction disc 31 carried by a shaft 32 journaled in the frame 27 and adapted to be rotated at a speed which is a combined function of the rate of turn and of the time during which such turn is being made. The disc 31 is adapted to be rotated by either one or the other of a pair of friction discs 33 and 34 carried by a circular rack 35 which is rotatable with and slidable on the shaft 24, and for this purpose is keyed on said shaft by means of the key 36. The length of the circular rack 35 is such that when it is in its normally central position, the friction discs 33 and 34 just clear the periphery of the cooperating friction disc 31, but when moved longitudinally along the shaft 24 to the left or to the right, as viewed in Fig. 1, the disc 31 will be frictonally engaged by the disc 34 or the disc 33, respectively, and driven thereby.

In the present embodiment the longitudinal movements of the rack 35 are derived from the gyroscope, and therefore are proportional to the rate of turn, and to this end a gear train is provided for actuating said rack in accordance with the precessional movements of the frame 16. In the form shown said gear train is constituted by a gear 37 carried by a shaft 38 which is journaled in the plate 21 and secured to or formed integral with the frame 16, said gear 37 being arranged to mesh with a pinion 39 secured to or formed integral with a countershaft 40 which is journaled in a plate 41 secured to the plate 21 in any suitable manner as by means of spacing rods 42 and 43. On the same shaft with the pinion 39 is another pinion 44 which meshes with and drives the circular rack 35 to impart longitudinal movement thereto along the shaft 24 on which it is keyed. It will now be apparent that since the circular rack 35 is keyed on the shaft 24 it will be rotated at constant speed by the drive shaft 20 through the bevel gears 22 and 23, and hence the friction discs 33 and 34 which are carried by the circular rack will be driven in like manner at a constant speed. It will be further apparent that upon precession of the frame 16 in one direction or another about the axis Y—Y due to a turn of the craft about its vertical axis the circular rack 35 will be moved also longitudinally on the shaft 24 in one direction or the other, thereby causing the friction discs 33 and 34 to engage the cooperating friction disc 31, said discs 33 and 34 being moved nearer the axis of rotation of the friction disc 31 the higher the rate of turn, so that they will take up a given fixed position for a given rate of turn as determined by the precession frame 16. The direction of the rotation of the rotor 13 and of the shaft 20 must be so co-related that upon a turn of the craft to the left the frame 16 will precess in the proper direction to cause the proper one of the friction discs 33 and 34 to engage the disc 31 and to rotate the latter disc clockwise, and counter-clockwise when the turn is to the right.

Referring more particularly to the detailed view in Fig. 5, each of the friction discs 33 and 34 is provided with notches 45 and 46 on its periphery in order that the cooperating friction disc be driven thereby only during one-half of each revolution so as to permit the circular rack 35 to take up the correct position corresponding to a given rate of turn which otherwise would not be possible on account of the relatively high friction between the discs 33, 34, and the disc 31. Hence the speed of rotation of the shaft 24 must be twice the speed which would ordinarily be required if the discs 33 and 34 were arranged to drive through a complete revolution thereof.

Means are now provided for transmitting the rotational movements of the disc 31 to a suitable indicating device which, in the present embodiment is constituted by the course-indicating dial 12, and for this purpose a pinion 47 is provided on the shaft 32 which is also journaled in a bracket 48. The gear 47 is arranged to mesh with a relatively large gear 49 carried by a countershaft 50 journaled in the bracket 27 and in a plate 51 secured to the bracket 27 in spaced relation therewith in any suitable manner, as by means of spacing rods 52 and 53. The countershaft 50 extends through the plate 51 and has its other end journaled in a plate 54 parallel to the plate 51 and secured thereto in spaced relation therewith by spacing members 55 and 56. A pinion 57 is provided on the countershaft 50 and is arranged to mesh with a relatively large gear 58 secured to or formed integral with another shaft 59 which is journaled in the plates 51 and 54, and which extends through the latter to form a support for carrying the course-indicating dial 12 which is rigidly secured thereto and rotatable therewith. The course-indicating dial is calibrated in the present instance, as shown in Fig. 4, in terms of compass direction and cooperates with a lubber's line 60 for indicating in degrees the amount and direction of the deviation and the new compass direction in which the mobile object may be heading after a turn is made in the same manner as indicated by a magnetic compass.

It is desirable that the instrument be capable of adjustment to operate with reference to any selected path or course, i. e. for setting a predetermined course which the mobile object is to follow and, for this purpose, means are provided for rotating the course-indicating dial 12 independently of its actuation by the integrating mechanism. In the form shown, said means comprise a rotatable shaft 61 journaled in an extension chamber 62 formed integral with the casing 7, and the shaft 61 has secured thereto or formed integral therewith a pinion 63 which is arranged to mesh with an idler gear 64 carried by a shaft 65, said idler gear being in constant mesh with the gear 58 through which the course-indicating dial 12 is actuated by the integrating mechanism. The shaft 61 is arranged to be moved longitudinally against the compression of a coil spring 65 encircling said shaft, interposed between a bracket 66 in which one end of the shaft 61 is journaled and an enlarged portion 67 of said shaft. A knurled knob 68 is provided for operating the shaft from the front of the casing to cause the longitudinal movement and rotation thereof to set the course-indicating dial for a predetermined course in accordance with the compass direction which it is desired to follow and which may be determined from a magnetic compass carried by the mobile object on which the instrument of the present invention is mounted.

The operation of the device is as follows: Assume that a predetermined or selected path or course on which it is desired to head the mobile object is due north. The ship or aircraft is swung until the magnetic compass indicates due north, at which time the knob 68 of the novel turn indicator is moved inward so that the pinion 63 engages the gear 64 and the knob is then rotated until the dial 12 indicates north with respect to the lubber's mark 60. The knob is then released and the pinion 63 and gear 64 are disengaged by the outward movement of the shaft 61 by the action of the coil spring 65a. The mobile object then is steered on the due north heading, but if for any reason, or due to any external influences the mobile object deviates to the left, for example, the gyro rotor 13 will cause the frame 16 to precess in a direction corresponding to the direction of turn or deviation, thereby causing the circular rack 35 to be moved in the proper direction so that the friction disc 34 engages the cooperating friction disc 31, the latter then being driven clockwise to rotate the course-indicating dial 12 also clockwise through the gear train 47, 49, 57, and 58, the speed of rotation of said disc 31, and hence the dial 12, being a combined function of the rate of turn and of the time during which such turn is made, since, if the rate of turn is relatively slow, the friction disc 34 will engage the disc 31 near its periphery, and if the rate of turn increases the disc 34 is moved closer to the axis of rotation of the disc 31, thereby causing the latter to be rotated faster by the constant speed shaft 24 through said disc 34. As soon as the turn or deviation has ceased the precession of the turn indicator will also cease and the frame 16 will be returned to its normally centralized position by means of the centralizing spring 16a and hence the circular rack 35 will also be returned to its normally central position and the friction disk 34 disengaged from the disc 31. The course-indicating dial 12 will then indicate, in terms of compass direction, the number of degrees which the mobile object has turned or deviated, and said object can then be steered so that it will turn in the opposite direction until the course-indicating dial again indicates the due north heading, in which case, during such a return deviation, the precessional frame 16 will precess in a direction opposite to that which it precessed in the first instance, thereby causing the disc 33 to engage the disc 31 to operate the latter, and hence the course-indicating dial 12 will be rotated in a counter-clockwise direction until the north mark coincides with the lubber's mark 60.

There is thus provided a novel instrument for indicating the angular distance traversed by a mobile object during a turn or a departure from a set path or course at any rate of such turn or departure, the indications being the result of the integration of the rate of turn with respect to the time during which said turn is made. By combining the element of time with the rate of turn or departure the indications are synchronized with the movements of the mobile object so that there is no lag between the deviation and the indications of such deviation thereby providing instantaneous, continuous, and accurate readings of the distance traversed by the mobile object in terms of compass direction.

Although only one embodiment of the invention has been illustrated and described, various changes and modifications in the form and arrangement of parts, which will now appear to those skilled in the art, may be made without departing from the scope of the invention. For example, the dial 12 may be made to be relatively stationary during indicating action, although adjustable for setting, and a pointer provided on the shaft 59 for cooperation with the dial. Reference is therefore to be had primarily to the appended claims for a definition of the limits of the invention.

What is claimed is,

1. A turn integrator for aircraft, comprising a rate-of-turn responsive gyroscope including a precessional frame pivoted on a fixed support, along the longitudinal axis of the craft, and a rotor journaled in said frame for rotation about a horizontal axis parallel to or coincident with the transverse axis of the craft whereby said gyroscope is caused to precess about the longitudinal axis upon turning of the craft about its vertical axis, a driving pinion connected to and operated by said precessional frame, a rotatable circular rack engaged by said pinion and adapted to move longitudinally along its own rotational axis, a relatively small friction disc on said rack and rotatable therewith, a relatively large friction disc having its face perpendicular to the plane of the small disc for frictional engagement therewith upon longitudinal movement of the rack due to a precessional movement of the gyroscope, a constant speed shaft for rotating said rack and also rotating said large disc when said small disc is moved into engagement therewith whereby the rate of turning of the craft is integrated with respect to time, and indicating means operated by said large disc for indicating the angle through which the craft has turned.

2. A turn integrator for aircraft, comprising a rate-of-turn responsive gyroscope including a precessional frame pivoted on a fixed support, along the longitudinal axis of the craft, and a rotor journaled in said frame for rotation about a horizontal axis parallel to or coincident with the transverse axis of the craft whereby said gyroscope is caused to precess about the longitudinal axis upon turning of the craft about its vertical axis, a driving pinion connected to and operated by said precessional frame, a rotatable circular rack engaged by said pinion and adapted to move longitudinally along its own rotational axis, a relatively small friction disc on each end of said rack and rotatable therewith, a relatively large friction disc having its face perpendicular to the planes of the small discs for frictional engagement with one or the other of said small discs upon longitudinal movement of the rack in one direction or another due to a precessional movement of the gyroscope, a constant speed shaft for rotating said rack and also rotating said large disc when either of said small discs is moved into engagement therewith whereby the rate of turning of the craft is integrated with respect to time, and indicating means operated by said large disc for indicating the angle through which the craft has turned.

3. In apparatus of the class described, the combination of course-indicating means adapted to be carried by a mobile object, means for adjusting said course-indicating means to operate with reference to any set path or course to be followed by said mobile object, means responsive to the rate of departure of said mobile object from said set path or course, a set of integrating discs comprising a relatively large disc connected to said course-indicating means and a pair of relatively small discs spaced apart in parallel planes perpendicular to the plane of the large disc and normally out of contact with the latter, means connecting said small discs to said rate responsive means whereby a respective one or the other of said small discs engages the large disc and is moved radially thereof producing a driving relation between said discs in accordance with the direction of departure of said mobile object, and a continuously operating constant speed mechanism for driving said small discs to combine the element of time with the rate of departure whereby said course-indicating means is operated by said large disc to indicate the amount of departure from the set path or course.

4. In apparatus of the class described, the combination of course-indicating means adapted to be carried by a mobile object, means responsive to the rate of turn of said mobile object, a set of integrating discs comprising a relatively large disc and a pair of relatively small discs spaced apart in parallel planes perpendicular to the plane of the large disc and normally out of contact with the latter, means connecting said small discs to said rate responsive means whereby a respective one or the other of said small discs engages the large disc and is moved radially thereof to produce a driving relation between said discs in accordance with the direction of turn of said mobile object, a continuously operating constant speed mechanism for driving said small discs to combine the element of time with the rate of turn whereby said large disc is operated in accordance with a combined function of the rate of turn and the time during which the turn takes place, and indicating means operated by said large disc for indicating the amount of the turn.

5. In apparatus of the class described, the combination of course-indicating means adapted to be carried by a mobile object, means for adjusting said course-indicating means to operate with reference to any set path or course, gyroscopic means responsive to the rate of turn of the mobile object from said set path or course, a disc operatively connected to move said course-indicating means, and a constant speed mechanism comprising a rotatable shaft, a circular rack rotatable with and slidable on said shaft and having a friction disc at each end thereof, and means connecting said gyroscopic means and said circular rack whereby the latter is moved to adjust a respective one of its friction discs radially of the first-mentioned disc in accordance with the direction of turn to actuate said first-mentioned disc upon operation of said gyroscopic rate responsive means to combine the element of time with the rate of turn, whereby said course-indicating means indicates the amount of such turn in proportion to and in synchronism with the latter.

6. In apparatus of the class described, the combination of course-indicating means adapted to be carried by a mobile object, means for adjusting said course-indicating means to operate with reference to any set path or course, gyroscopic means mounted for precession in response to the rate of turn of the mobile object from said set path or course, a continuously operating constant speed mechanism, a relatively large disc, a relatively small disc perpendicular to the plane of said large disc, means connecting the small disc to said gyroscopic rate responsive means for moving said small disc radially of the large disc to effect a driving relation between said discs in accordance with the direction of turn whereby one of said discs is adapted to drive the other, and means connecting the driving disc to the constant speed mechanism to cause said driving disc to drive the driven disc for combining the element of time with the rate of turn whereby said course-indicating means is operated by the driven disc to indicate the amount of turn from the set path or course.

7. In apparatus of the class described, the combination of course-indicating means adapted to be carried by a mobile object, gyroscopic means mounted for precession in response to the rate of turn of the mobile object, a continuously operating constant speed mechanism, a relatively large disc, a relatively small disc perpendicular to the plane of said large disc, means connecting the small disc to said gyroscopic rate responsive means for moving said small disc radially of the large disc to effect a driving relation between said discs in accordance with the direction of turn whereby one of said discs is adapted to drive the other, means connecting the driving disc to the constant speed mechanism to cause said driving disc to drive the driven disc for combining the element of time with the rate of turn, and means operated by the driven disc for indicating the amount of turn.

WESLEY L. SMITH.